H. G. GREENE.
SPRING TRAP.
APPLICATION FILED NOV. 23, 1916.
1,312,690.
Patented Aug. 12, 1919.
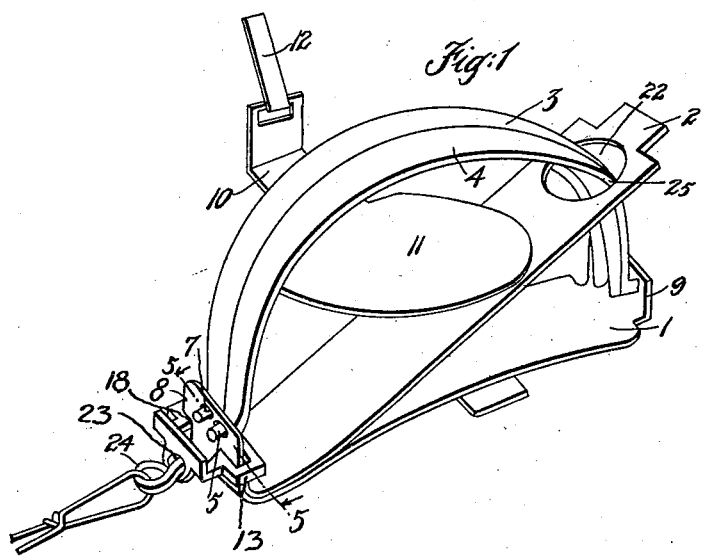
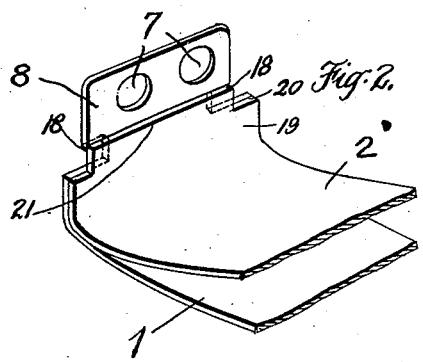
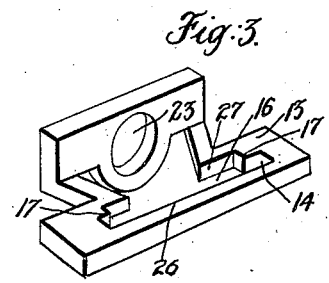
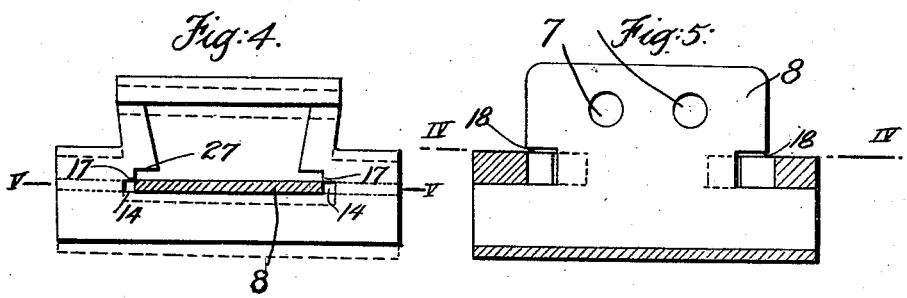
H. G. Greene, Inventor
By his Attorney
Charles H. Wilson

UNITED STATES PATENT OFFICE.

HOLDRIDGE G. GREENE, OF ONEIDA, NEW YORK, ASSIGNOR TO TRIUMPH TRAP CO., OF ONEIDA, NEW YORK, A CORPORATION OF NEW YORK.

SPRING-TRAP.

1,312,690.     Specification of Letters Patent.     Patented Aug. 12, 1919.

Application filed November 23, 1916. Serial No. 132,965.

*To all whom it may concern:*

Be it known that I, HOLDRIDGE G. GREENE, residing at Oneida, in the county of Madison and State of New York, have invented certain new and useful Improvements in Spring-Traps, of which the following is a specification.

This invention relates to animal traps of the type commonly known as "jump traps," such term designating a type of trap wherein the release of the detent or dog by a depression of the platform causes a re-action to take place between the base spring and the ground whereby the whole device will bound or jump from the ground bodily and thereby cause the jaws of the trap to obtain a higher and more firm grasp upon the leg of the animal.

The present invention contemplates certain improvements in the structure of trap disclosed and claimed in the application of Giles A. Graves, Serial Number 828,430.

One of the objects of the invention is to provide a trap of a construction such that the parts entering into the construction of the trap are so assembled or connected together that no part is weakened.

Another object is to provide a trap wherein the parts are so assembled or connected together, that certain of such parts which are liable to become broken or otherwise deranged may be readily separated for repairs or replacement.

Another object is to provide a trap whereby certain of the parts, as the tongue and the spring, may be made considerably wider and stronger than in traps as hitherto constructed, without enlarging or changing the dimensions of the trap as a whole.

Other advantages flowing in part from the foregoing objects of the invention reside in the increased efficiency of the trap, decrease in the cost of construction, and economy to the consumer by reason of the fact that he can readily repair his own trap when broken rather than discard the entire device.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 indicates a view, in perspective, of the complete trap constructed in accordance with the present invention.

Fig. 2 is an enlarged perspective view of the end portions of the springs.

Fig. 3 is a similar view of the connecting member for the trap springs, which member also operates as a part of the swivel arrangement to which the chain is attached.

Fig. 4 is a top plan view of the part shown in Fig. 3, with one of the trap springs shown in section; on line IV—IV of Fig. 5; and Fig. 5 is a sectional view taken on line V—V of Figs. 1 and 4, looking in the direction of the arrow.

Similar reference characters refer to similar parts throughout the various figures of the drawing.

Referring now to the drawings, the reference numeral 1 indicates the base spring member, 2 indicates the jaw operating spring and 3 and 4 respectively indicate the jaws, the end portions 5 of which pivot in suitable openings 7 provided in upstanding portions 8 and 9 respectively of the base spring 1. Pivotally supported upon the cross bar 10 is the usual pan 11 with which is adapted to coöperate the detent 12 when the trap is set in the usual manner.

Referring now to Fig. 3 of the drawings, the connecting member 13 is provided with a slot 14, which slot has an offset or widened portion 16 of less length than the main portion of the slot 14 providing the shoulders 17.

The upturned end 8 of the base spring 1 is also provided with lateral slots 18.

The jaw operating spring 2 is provided with an upstanding portion 19, the upper corners of which are cut away leaving the shoulders 20 and the upstanding reduced portion 21. This reduced portion 21 is equal in width to the length of the slot 14 in the connecting member 13. The width of the upstanding portion 8 from the bottom of the slots 18 is equal to the length of the offset portion 16.

The jaw operating spring 2 is provided with the usual opening 22 through which the jaws pass in the usual manner, the walls of which slot operate to close the jaws when the trap is sprung.

The rear portion of the connecting member 14 is provided with an opening 23 through which the swivel 24 is passed, said latter member being held in position therein by riveting the inner end thereof.

In assembling the trap the upstanding end 8 of the base spring 1 is passed upward into the slot 14 of the connecting member 13. The connecting member 13 is then pushed slightly forward so that the shoulders 17 will enter the slots 18 of the upstanding part 8. The reduced portion 21 of the upstanding part 19 of the member 2 is then inserted into the slot 14. The jaws 3 and 4 are then positioned as shown in Fig. 1 of the drawings, the wall of the opening 22 engaging against shoulders, one of which is shown at 25.

It will be understood, of course, that with the base spring 1 and the jaw operating spring 2 in the position shown in Fig. 1 of the drawings, both springs are under tension, whereby the jaws are maintained forcibly closed due to the engagement of the opening 22 with the curved shoulders 25 of the jaws. Inasmuch as the base spring 1 and the jaw operating spring 2 are under tension, and the fact that the outer ends of said springs cannot separate further, due to the engagement of the wall of the opening 22, and the gradually increasing thickness of the jaws 3 and 4 above the shoulders 25, the inner ends of each of said spring members are interlocked with the connecting member 1. The shoulders 20 of the upstanding portion 19 of the jaw operating spring 2 being pressed upwardly against the lower surface of the connecting member 13. The shoulders 17, however, of the connecting member 13 being received in the slots 18, serve to lock the upstanding portion 19 of the jaw operating spring 2 and the upstanding portion 8 of the base spring 1 against relative movement. The thickness of the upstanding portions 21 and 8 is just sufficient to fill the space between the walls 26 of the slot 14 and the back wall 27 of the offset portion 16. Thus it will be seen that the parts in position as shown in Fig. 1 of the drawings, the base spring 1, the jaw operating spring 2, and the connecting member 13 are firmly locked together, and any depression of the jaw operating spring 2 as when the trap is set only serves to more firmly hold these parts in fixed relation. The engagement of the wall of the opening 22 in the jaw operating spring 2 with the gradually increasing shoulders 25 of the jaws 24 hold the interlocked parts in fixed relation when the trap has been sprung and the various parts are in the relative position shown in Fig. 1 of the drawings.

During the use of the trap should either of the springs 1 or 2 become broken, it will be seen that the tension of the springs being thus removed, the parts may be readily separated without removal of any bolts or rivets whereby replacement or repair can be easily effected. The construction is such, however, that when the trap is in normal condition all the parts are firmly wedged and interlocked together so that accidental displacement of any part cannot occur.

By reason of the construction as hereinbefore described, it will be noted that no part has been weakened as by the use of rivets usually employed to fasten the springs together, that no machine or joining operation are necessary in the manufacture of the trap whereby the cost of construction is reduced, and yet it is possible for the consumer to readily dismantle the trap when any one member thereof is broken, thereby sparing him the necessity of either discarding the trap or returning it to the manufacturer for repairs.

Having thus described my invention what I claim as new and desire to secure by Letters Patent is:

1. In an animal trap of the class described, a pair of separately formed spring members, jaws swiveled in one of said spring members, a connecting member provided with an elongated slot having an offset portion, one of said spring members having an upstanding portion adapted to be received in the offset portion of said slot and the other of said spring members having an upstanding portion adapted to be received in said slot, the first named of said spring members being provided with lateral slots and shoulders provided in said connecting member adapted to be received in said lateral slots.

2. In an animal trap of the class described, a base member having upturned ends, jaw members swiveled in said upturned ends, a spring jaw operating member, a connecting member provided with an elongated slot and an offset portion of a length less than the slot proper, the upturned end of said base member being adapted to be received in said offset portion of said connecting member, the latter being provided with a pair of oppositely disposed shoulders which are received in the lateral slots of the upturned portion of the base member, said spring jaw operating member being provided with a shouldered upturned part adapted to be received in the slot of said connecting member.

3. In an animal trap of the class described, a pair of separately formed spring members, a connecting member, each of said spring members having upstanding parts at one end which lie adjacent each other, said connecting member having a slot with an offset portion, the upstanding portion of one of said spring members being adapted to be received in said offset portion, and the offset portion of the other of said spring members being adapted to be received in said slot, the first mentioned spring member having slots in its upstanding part, and a pair of shoulders on said connecting member adapted when the upstanding part of the second mentioned spring member is positioned in said slot to occupy the slots in the upstanding part of said first mentioned spring member.

4. In an animal trap of the class described, a pair of separately formed spring members, a connecting member, each of said spring members having upstanding parts at one end which lie adjacent each other, said connecting member having a slot with an offset portion, the upstanding portion of one of said spring members being adapted to be received in said offset portion, and the offset portion of the other of said spring members being adapted to be received in said slot, the first mentioned spring member having slots in its upstanding part, a pair of shoulders on said connecting member adapted when the upstanding part of the second mentioned spring member is positioned in said slot to occupy the slots in the upstanding part of said first mentioned spring member, and a pair of jaws swiveled in one of said spring members and passing through an opening in the other of said spring members the wall of said opening engaging said jaws and adapted to close the same, the relation of the parts being such that said spring members are constantly under tension, whereby they and the connecting members are maintained in fixed engagement.

5. In an animal trap, a base spring, a jaw operating spring, a connecting member, said connecting member having an elongated forwardly located slot with a rearwardly extending offset portion of less length, said base spring having a slotted upstanding part extending through said offset portion, said jaw operating spring having a shouldered upstanding part extending into said slot, and forwardly extending shoulders provided upon said connecting member which are received in the slots of the upstanding part of said base spring.

In testimony whereof I affix my signature in the presence of two witnesses.

HOLDRIDGE G. GREENE.

Witnesses:
LYSLE R. DUNBAR,
ALBERT E. KINSLEY.

Copies of this patent may be obtained for five cents each, by addressing the "Commissioner of Patents, Washington, D. C."